United States Patent Office.

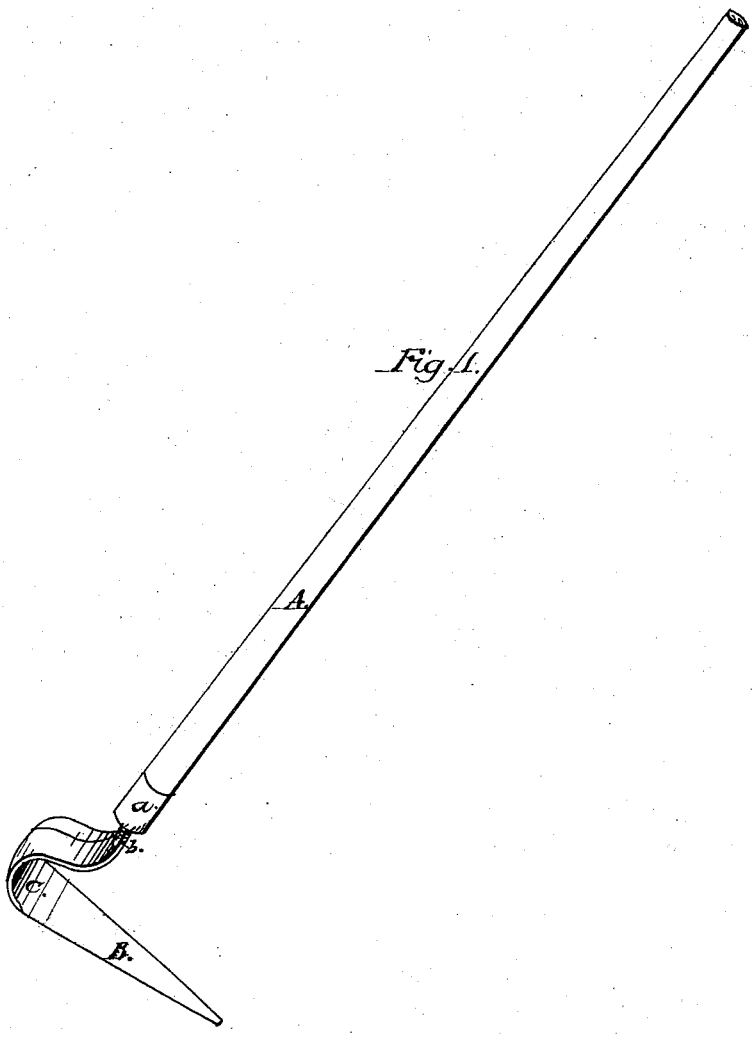

JEROME S. MUNGER, OF OLEAN, NEW YORK.

Letters Patent No. 88,659, dated April 6, 1869.

---

IMPROVEMENT IN WEEDING-HOE.

---

The Schedule referred to in these Letters Patent and making part of the same.

---

*To all whom it may concern:*

Be it known that I, JEROME S. MUNGER, of Olean, in the county of Cattaraugus, and State of New York, have invented certain new and useful Improvements in a Weeding-Hoe, for the cultivation of vines, flowers, and all kinds of garden-vegetables; and the following is a full, clear, and exact description of the same, reference being had to the accompanying drawings, making a part of this specification, in which—

Figure 1 represents a perspective view of my improved weeding-hoe.

The object of my invention is to enable vine-growers, horticulturists, and gardeners, to take out all of the weeds, and loosen the earth close to and around the plants, without cutting or endangering the plants in the slightest manner, and with greater facility than can be done, and with more ease, than by any other construction or form of implement that has ever come to my knowledge.

My invention consists in the construction and peculiar formation of the hoe, or cutting-blade with a bow, extending back from the shank and line of the handle full one-third the distance of the length of the operating or cutting-blade, which tapers to a point, having both edges sharp, from the point to the curve of the bow, which is dull, forming a safe edge, as the hoe is worked up close to the vines or plants.

To enable others to make and use my invention, I will describe it more fully, referring to the drawing, and to the letters marked thereon.

The weeding-hoe, or implement, may be made of any desired size, or dimensions, or of various sizes, to suit the various purposes of cultivating, the handle A being provided with a ferrule, *a*, so that the shank *b* of the cutting-blade B can be fitted, and driven in firmly.

From the shank *b* the metal is widened out, to form the bow *c*, which extends back, or one side of the centre of the handle A, one-third of the whole length of the cutting-blade B, the straight portion of which papers from the bow to the point, both edges being shaped so as to cut any soft substance easily; while on the portion forming the bow *c* the edges are made quite dull, and act as safe-edges against vines and plants that are hard enough to be borne against, forming a fulcrum, to cut off suckers, or runners, or offshoots, near the roots, or surface-roots, as well as rank weeds, or anything that obstructs the proper growth of the vines, plants, or shrubs.

The long, narrow, tapering point B, is peculiarly adapted to loosening the earth around young, or tender plants, or flowers, and also vines, to a considerable depth, the safe-edge bow *c* protecting the stem, while the sharp-edged point does its work.

The advantages of my improved weeding-hoe are readily seen, and are duly appreciated by every one who has tried it, it having been made of various sizes, and thoroughly tested for all of the purposes enumerated during the last season; and double the amount of weeding can be done in a given time, with less labor and fatigue, and no injury to the vines, or plants, than any other known or used, so that the utility of the invention cannot be questioned, if it does not display any great degree of novelty.

Having thus fully described my invention,

What I claim as new and useful, is—

A weeding-hoe, constructed in the manner herein described, as a new article of manufacture.

In testimony whereof, I hereunto subscribe my name, in the presence of—

JEROME S. MUNGER.

Witnesses:
W. T. ELLITHORP,
L. H. KELSEY.